Jan. 31, 1933. E. BLAKER 1,895,909
METHOD OF AND APPARATUS FOR LOOSENING AND REMOVING ARTICLES FROM MOLDS
Filed April 7, 1932 3 Sheets-Sheet 2
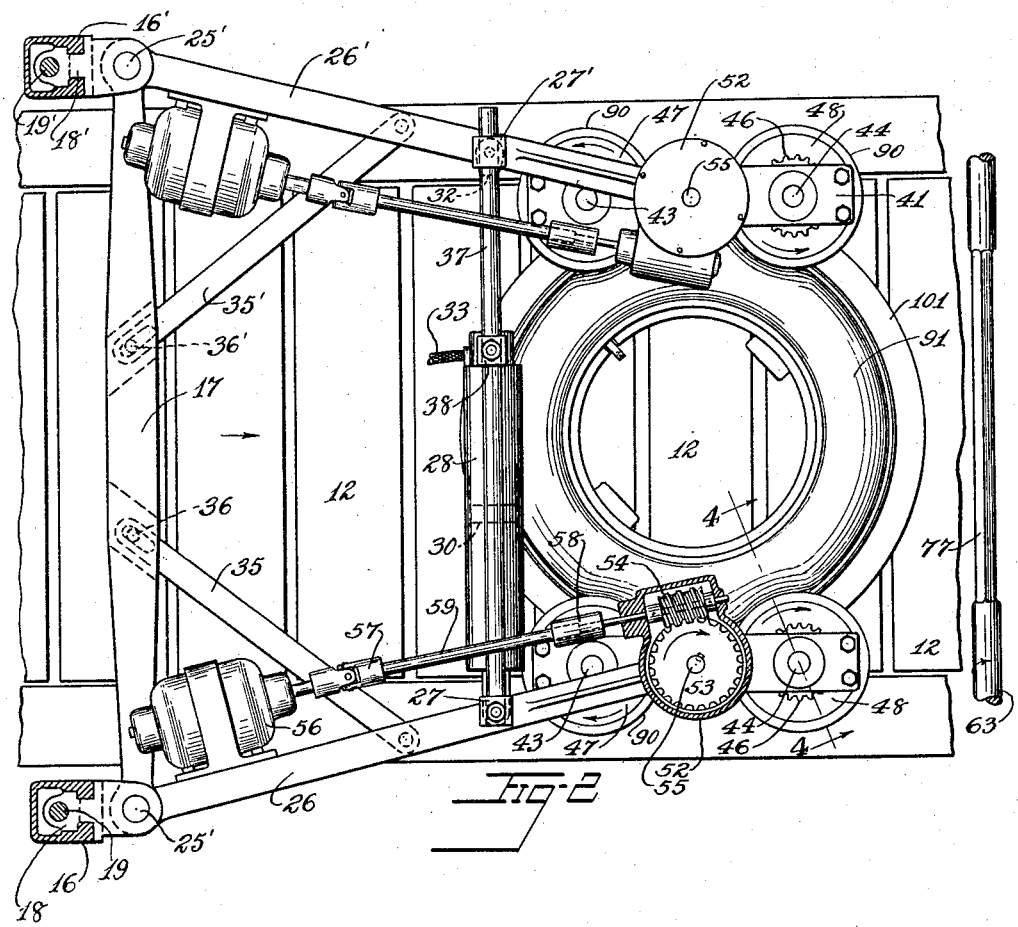
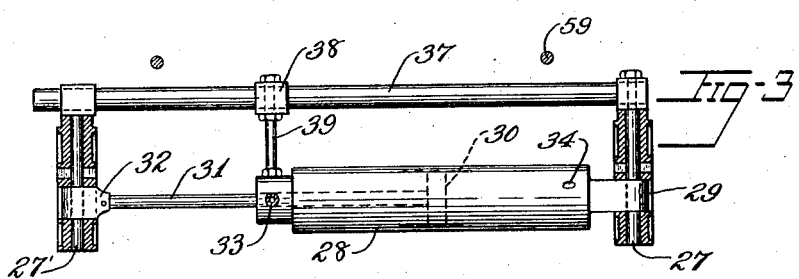
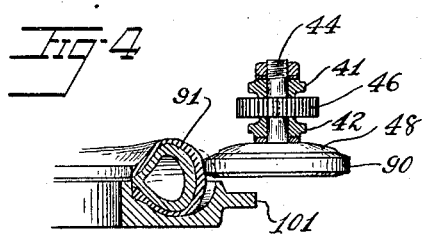
Inventor
Ernest Blaker
By Eskin & Avery
Attys.

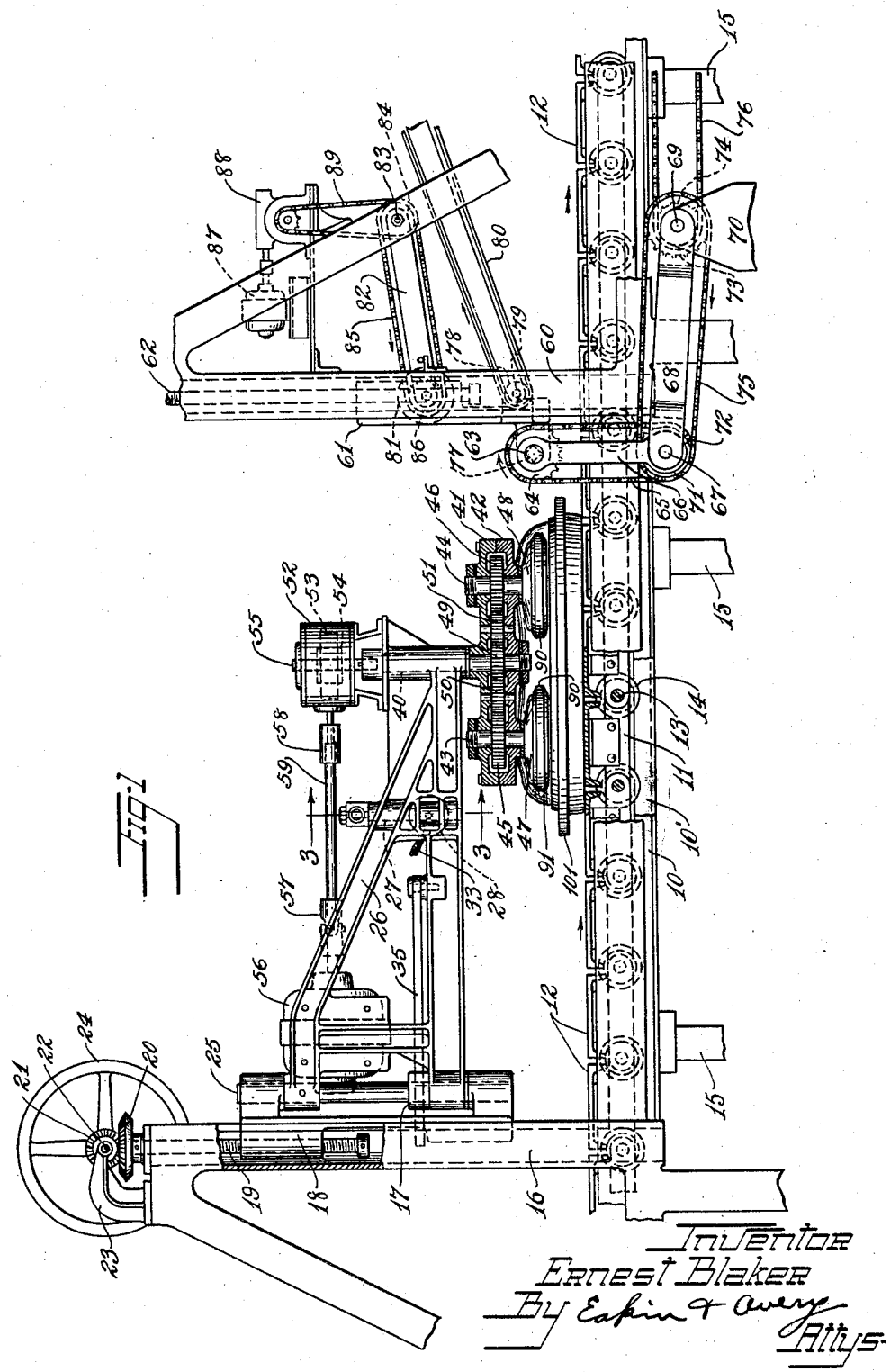

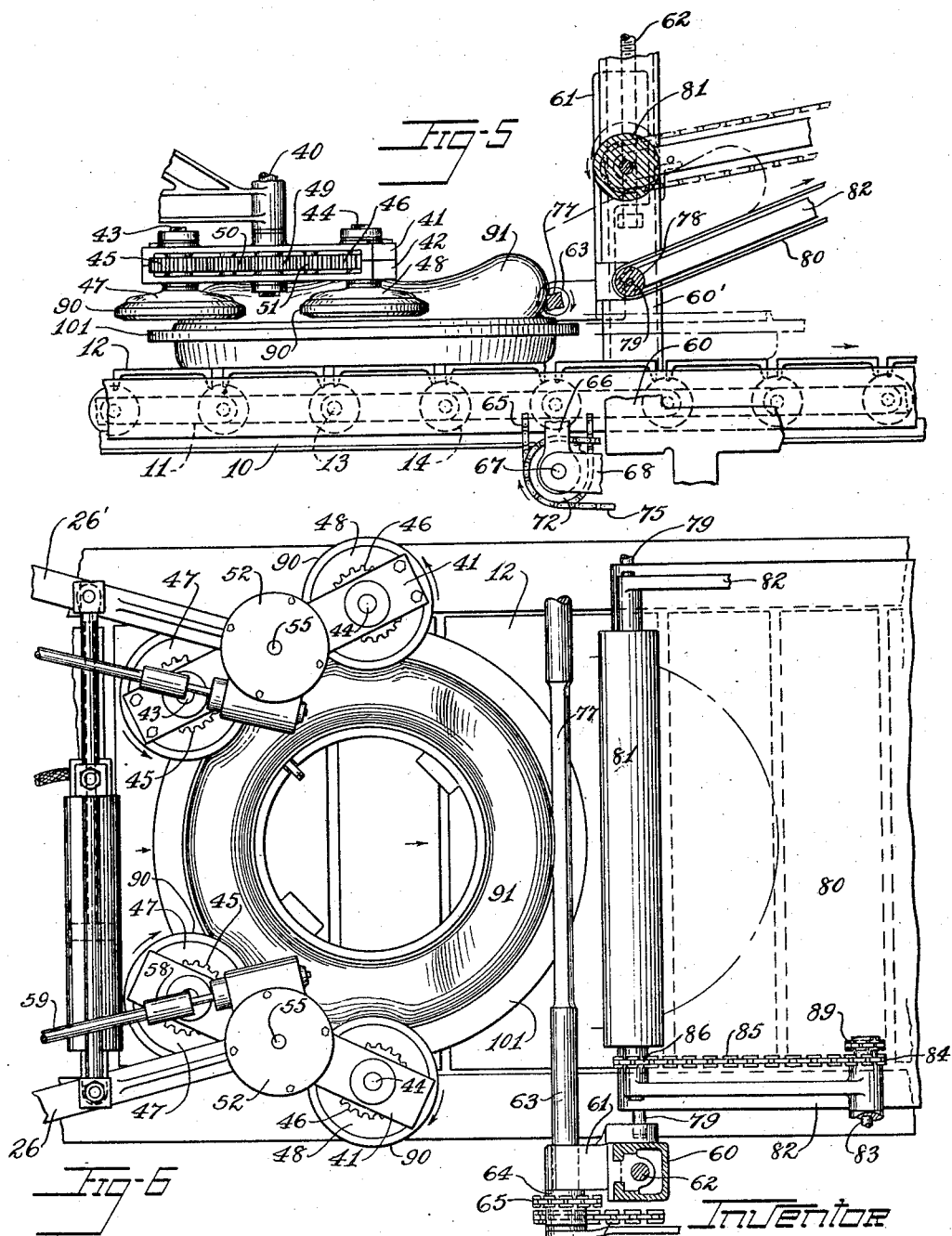

Patented Jan. 31, 1933

1,895,909

UNITED STATES PATENT OFFICE

ERNEST BLAKER, OF AKRON, OHIO, ASSIGNOR TO THE B. F. GOODRICH COMPANY, OF NEW YORK, N. Y., A CORPORATION OF NEW YORK

METHOD OF AND APPARATUS FOR LOOSENING AND REMOVING ARTICLES FROM MOLDS

Application filed April 7, 1932. Serial No. 603,713.

This invention relates to a method of loosening and removing molded articles from their molds and is especially useful in the manufacture of pneumatic tires or other flexible molded articles.

The principal objects of the invention are to provide for positive and automatic loosening of the article before lifting it from the mold and thereby to assist the article lifting mechanism and avoid excessive strains in the article, to provide efficiency and economy in operation and to decrease the cost of manufacture.

Other objects will be apparent from the following description and the accompanying drawings.

In the drawings:

Fig. 1 is a side elevation of a portion of a mold conveyor and the article loosening and stripping apparatus, parts being broken away and other parts being shown in section to more clearly illustrate the device, a tire being shown to illustrate its position in relation to the article loosening mechanism.

Fig. 2 is a plan view of the same, with the tire in the same position, parts being broken away and parts being shown in section.

Fig. 3 is a detail view, partly in section on line 3—3 of Fig. 1 showing the means for providing yielding pressure to the swing-frames.

Fig. 4 is a detail sectional view on line 4—4 of Fig. 2 showing one of the discs deflecting the article from mold contacting relation.

Fig. 5 is a side elevation similar to Fig. 1 but showing the tire being stripped from the mold during the progressive loosening of the tire from the mold, parts of the mechanism being broken away.

Fig. 6 is a plan view of Fig. 5, some parts being shown in section and parts being broken away.

Referring to the drawings, the numerals 10, 10' designate horizontal rail or frame members for supporting and guiding a platform mold conveyor comprising a pair of spaced chain members having links 11, supporting cross slats 12, and rods 13 which carry antifriction rollers 14 which ride on the rails 10, 10'.

The conveyor extends from a loading station (not shown) past a series of vulcanizers (not shown). Frames 15 support the rails 10, 10' in spaced relation.

Attached to the rails 10, 10' along the path of the conveyor are frame members 16, 16' having vertical guideways machined therein. A cross head 17 is slidably fitted to said guideways and is provided with threaded lugs 18, 18' which extend into the guideways and engage vertical screws 19, 19'. Screws 19, 19' are journaled in frames 16, 16' and carry bevel gears 20, 20' which mesh with pinions 21, 21', mounted on a shaft 22. Shaft 22 is journaled in bearing brackets 23, 23' mounted on frames 16, 16', and is provided with a hand-wheel 24 whereby it may be rotated to adjust the cross-head 17 with respect to the conveyor.

A pair of vertically disposed shafts 25, 25', are mounted in suitable lugs on cross-head 17 and provide pivots for a pair of swing-frames 26, 26' hinged thereto. Each swing frame is provided intermediate of its extent with bearings for receiving pins 27, 27'. A cylinder 28 is provided with an ear 29 which engages one of said pins. A piston 30 mounted in the cylinder is connected to a piston rod 31 which has a knuckle 32 engaging the other rod. A flexible hose 33 from a source of fluid pressure (not shown) connects with the rod end of cylinder 28. The other end of the cylinder is vented as at 34 to the atmosphere. Pressure fluid admitted to the cylinder causes the swing-frames to be yieldingly urged toward each other.

In order to limit the swing of frames 26, 26', links 35, 35' are each pivoted at one end to a swing frame member and at the other end are slotted to engage pins 36, 36' on crosshead 17. To prevent wear of the piston rod 31 and its stuffing box, pins 27, 27' are cross bored to engage a guide rod 37 which is locked to pin 27' at one end and is free to slide through pin 27. A collar 38 on rod 37 carries a strap support 39 which holds the rod end of the cylinder.

Each of the swing frames 26, 26', is provided with vertical journal bearings at its outer extremity in which is rotatably mounted a shaft such as shaft 40. The mechanism supported and driven by each shaft is alike and only one will be described.

A yoke made in halves 41, 42 is rotatably mounted on the lower extremity of shaft 40 and supports a pair of vertical shafts 43 and 44 journaled therein. Each of these shafts is provided with a gear 45 and 46, fixed thereon and on its lower end carries an article deflecting and driving disc 47 and 48. A gear 49 is fixed on shaft 40 and intermediate planetary gears 50 and 51 carried by the yoke each mesh with the gear 49 and one of the gears 45 and 46, the arrangement being such that when the yoke 41 is prevented from rotating on shaft 40, the discs 47, 48 will be driven by the shaft 40 and when the yoke 41 is free to rotate with shaft 40 the discs 47, 48 will no rotate.

A gear case 52 mounted on the swing frame 26 encloses a worm gear 52 and worm 54. Worm wheel 53 is mounted on a vertical shaft 55 which is in line with and drives shaft 40. An electric motor 56 mounted on the swing frame 26 drives worm 54 through universal joints 57 and 58 and shaft 59. The direction of rotation of the discs 47 and 48 carried by swing frame 26 is opposite to that of the similar discs carried by swing frame 26′ as indicated by the arrows in Fig. 2.

Mounted along the rails 10, 10′ is a second pair of stationary frame members 60, 60′, similar to frame members 16, 16′ and having vertical guide ways machined therein. A carriage 61 slidably mounted on the guideways is adapted to be adjusted vertically by screws 62 and is provided with bearings for supporting a horizontal shaft 63. Shaft 63 carries a sprocket 64 adapted to be driven by a chain 65. A link 66 has one end journaled on shaft 63 and its other end provides a journal for a shaft 67. A second link 68 has one end journaled on shaft 67 and the other end journaled on a shaft 69 which is rotatably mounted in a pedestal bracket 70 fixed to the frame which supports the conveyor rails 10. Sprockets 71 and 72 are fixed to shaft 67. Sprockets 73 and 74 are fixed to shaft 69. Chain 65 is driven by sprocket 71 and sprocket 72 is driven by a chain 75 from sprocket 73. A chain 76 engages sprocket 74 and drives it from any convenient source of power such as a motor (not shown). The arrangement is such that chain 76 through the described gearing drives shaft 63 at any position to which it may be adjusted.

Shaft 63 is provided with a polygonal portion 77 adapted to engage the leading marginal or tread portion of the advancing article and exert a lifting frictional engagement therewith, shaft 63 being rotated in a clockwise direction as seen in Figs. 1 and 5.

A roller 78 mounted on a shaft 79 journaled in carriage 61 supports one end of a conveyor belt 80 which delivers the stripped articles away. A weighted roll 81 mounted on swinging arms 82 cooperates therewith in starting the articles over the conveyor. Arms 82 are pivotally mounted on a shaft 83 which is driven from any convenient source of power, as by a motor 87, speed reducing gear 88 and chain 89, and carries a sprocket 84 which through a chain 85 and sprocket 86 drives roll 81 independent of its elevation in respect to roll 78.

The discs 47 and 48 are preferably provided with article contacting faces 90 of material having a high frictional coefficient with respect to the article 91. For this purpose the faces 90 are preferably made of superimposed layers of canvas belting or similar material.

As the device has been found to be especially useful in removing tires from their mold members, the apparatus is shown in the drawings as operating on such an article.

The operation of the device is as follows:

The articles such as the tire 91 illustrated are shown as being partially enclosed by mold members 101 to which they are held in adhering relation by the adhesion of the rubber to the mold member, atmospheric pressure, and the interlocking of projecting parts of the article. Each tire and its enclosing mold member has been deposited on the conveyor and is traveling in the direction indicated by arrows in Fig. 1.

Cross-head 17 is adjusted to a position where the discs 47, 48 will contact with the projecting marginal portions or tread of the tire without contacting with the mold. Carriage 61 is similarly adjusted so that shaft 63 will clear the mold and contact with the leading side of the marginal tread surface of the tire.

Current is supplied to motors 56 and yokes 41 being free to rotate will be rotated thereby, the yoke carried by swing frame 26 being rotated slowly in a clockwise direction in Fig. 2 and that carried by swing frame 26′ being slowly rotated in a counterclockwise direction. As a tire reaches such a position as to contact with a disc 47 or 48 the supporting yoke is swung on its axis until both discs 47 and 48 contact with the tread of the tire, whereupon further rotation of the yoke, except as permitted by the contour of the tire is prevented and practically all rotative motion of shaft 40 is transmitted to discs 47 and 48 in such a direction as to effect a frictional driving of the tire in the direction it has been travelling. The yielding pressure applied to the discs by cylinder 28 causes the tire to be deflected from the mold walls along the area of the tire contacted with by the discs, thereby progressively loosening the tire from the mold while effecting forward movement of the same.

In the first position of contact with the tire the discs contact with about two thirds of the leading half of the tread surface, but due to the fact that they rotate in such a direction as to urge the tire along the conveyor in the direction it has been travelling, no positive driving dogs are required to advance the tire.

At mid position the discs assume the relation to the tire shown in Fig. 2 and when the tire has advanced far enough to contact with the rotating bar 77 the discs have assumed the relation shown in Fig. 6 at which position more than one half of the tread surface has been progressively loosened from the mold, thereby greatly reducing the work required by the bar 77. In this position the discs exert even a greater advancing force on the tire due to their camming action on the laterally decreasing width of the tire.

The bar 77 first deflects the central portion of the leading tread surface and then by frictional engagement assisted by the ribs constituting the tread of the tire, lifts that portion as indicated in Figs. 5 and 6. The loosened portions along the sides enable the tire to be snapped from the mold and the leading side of the tire passes over the roll 78 where it is grabbed by the rolls 78 and 81 and pulled from the mold.

The mold passes on under the bar 77 as indicated in dot and dash lines in Figs. 5 and 6.

The loosening of the article in advance of contact with the stripping bar 77 assures positive operation of the stripping bar and the elimination of driving dogs, made possible by the positive driving of the article-deflecting discs, increases production as it provides for closer spacing of the molds on the conveyor regardless of the size of the molds or of uniformity in the size of molds in a promiscuously arranged advancing line of molds. The elimination of driving dogs also makes it possible to convert existing conveyor apparatus at less expense.

I claim:

1. Apparatus for removing a molded article from a mold member, said apparatus comprising a conveyor for advancing the mold member, and means located along the path of the conveyor for progressively deflecting the marginal portions of the article from mold contact and simultaneously assisting the advancing of the article along the conveyor.

2. Apparatus for removing a molded article from a mold member, said apparatus comprising a conveyor for advancing the mold member, and means located along the path of the conveyor and laterally engaging the projecting marginal surface of the article to deflect the walls thereof from the walls of the mold and simultaneously effect advancing of the article along the conveyor.

3. Apparatus for removing a molded article from a mold member, said apparatus comprising a conveyor for advancing the mold member, and a positively driven disc for engaging the exposed marginal surface of the article to deflect the article from mold contact and simultaneously effect advance thereof along the conveyor.

4. Apparatus for removing a molded article from a mold member, said apparatus comprising a conveyor for advancing the mold member, a plurality of positively driven discs for progressively engaging the exposed marginal surface of the article, and means for pressing the discs against the article.

5. Apparatus for removing a molded article from a mold member, said apparatus comprising a conveyor for advancing the mold member, a positively driven disc located in the path of the article and adapted to engage a leading portion of the marginal surface thereof and to advance the article by rolling contact along its margin, and means for maintaining sufficient pressure on said disc to deflect the article from the mold at its area of contact with the disc throughout the rolling movement.

6. Apparatus for removing a molded article from a mold member, said apparatus comprising a conveyor for advancing the mold member, a pair of rotatable yoke members each having a plurality of rotatable article-contacting discs mounted thereon, means for positively driving said discs, and yielding pressure means for holding said discs in the path of the article for progressive rolling contact with the marginal portion thereof whereby the article is progressively deflected from mold contact.

7. Apparatus for removing a molded article from a mold member, said apparatus comprising a conveyor for advancing the mold member, a rotating stripper bar for engaging the leading marginal portion of the article and lifting it from the mold member, and means for engaging the marginal walls of the article in advance of its contact with the stripping bar and progressively loosening the article from the mold and simultaneously therewith positively driving the article into contact with the stripper bar.

8. Apparatus for removing a molded article from a mold member, said apparatus comprising a conveyor for advancing the mold member, a rotating stripper bar for engaging the leading margin of the article and effecting a lifting motion thereto, and a plurality of laterally pressed rotating discs adapted to engage the marginal portions of the article and while positively driving the article toward said stripper bar to progressively loosen the article from the mold member.

9. The method of removing a molded article from a mold member which comprises advancing the mold along a determinate path, progressively deflecting the article from mold contact by rolling pressure applied to its marginal walls, and stripping said article from the mold member by frictional engagement with the leading portion of the marginal wall while advancing the article by its rolling contact.

10. The method of removing a molded article from a mold member which comprises advancing the mold along a determinate path, progressively deflecting the article from mold contact by lateral pressure applied to its walls, and stripping the loosened article from the mold by applying a frictional lifting force to the leading portion of its margin while applying an advancing force directly to the article by frictional rolling engagement therewith.

11. The method of removing a molded article from a mold member which comprises advancing the mold along a determinate path, progressively deflecting the article from mold contact by lateral pressure simultaneously applied to opposite sides of the article during its advancing movement, and applying a lifting force to the leading portion of the margin of the article while simultaneously applying angularly directed forces to the trailing margin the resultant of which is directed toward the leading margin.

In witness whereof I have hereunto set my hand this 21st day of March, 1932.

ERNEST BLAKER.